(No Model.) 2 Sheets—Sheet 2.
W. H. SINGER.
MANUFACTURE OF SAW PLATES.
No. 390,809. Patented Oct. 9, 1888.
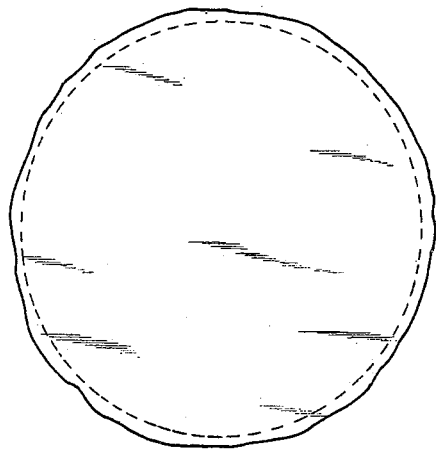
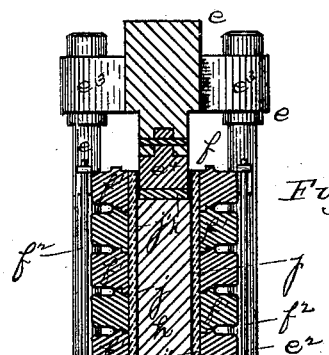
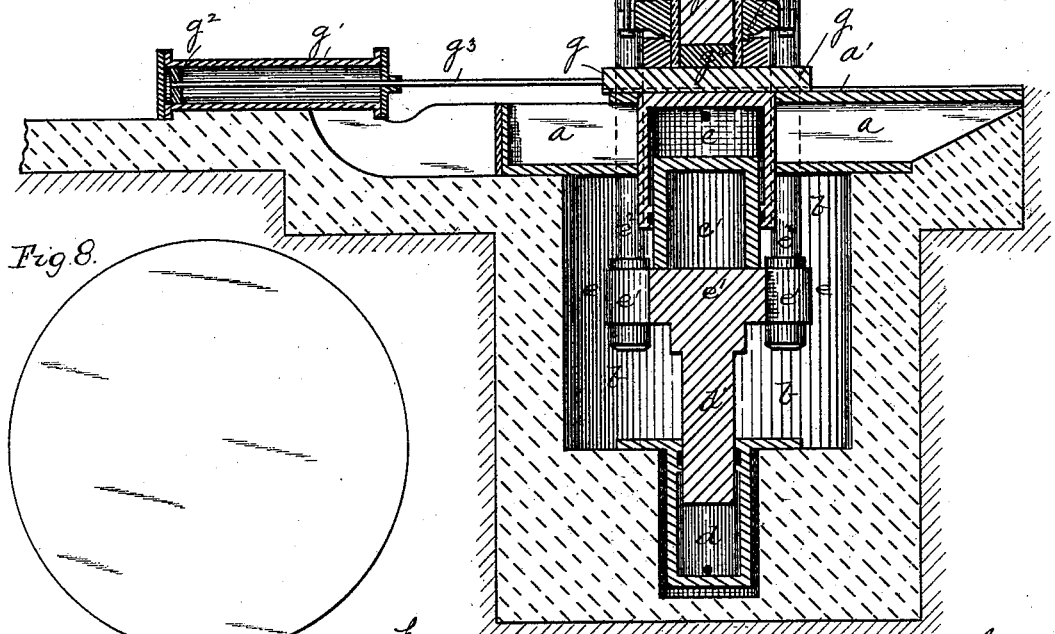
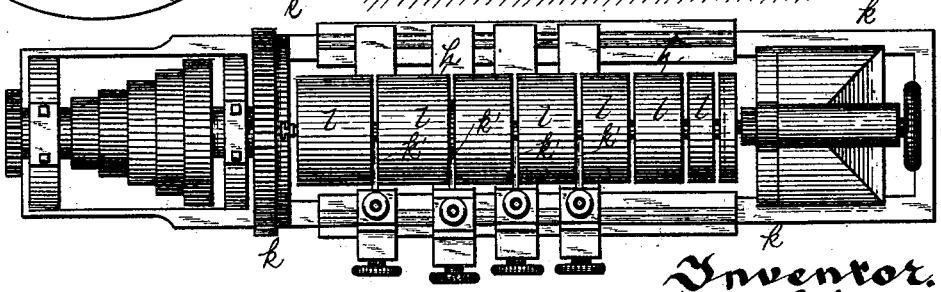
Witnesses:
J. N. Cooke
Robt. D. Totten
Inventor.
William H. Singer
By James J. Kay
Attorneys

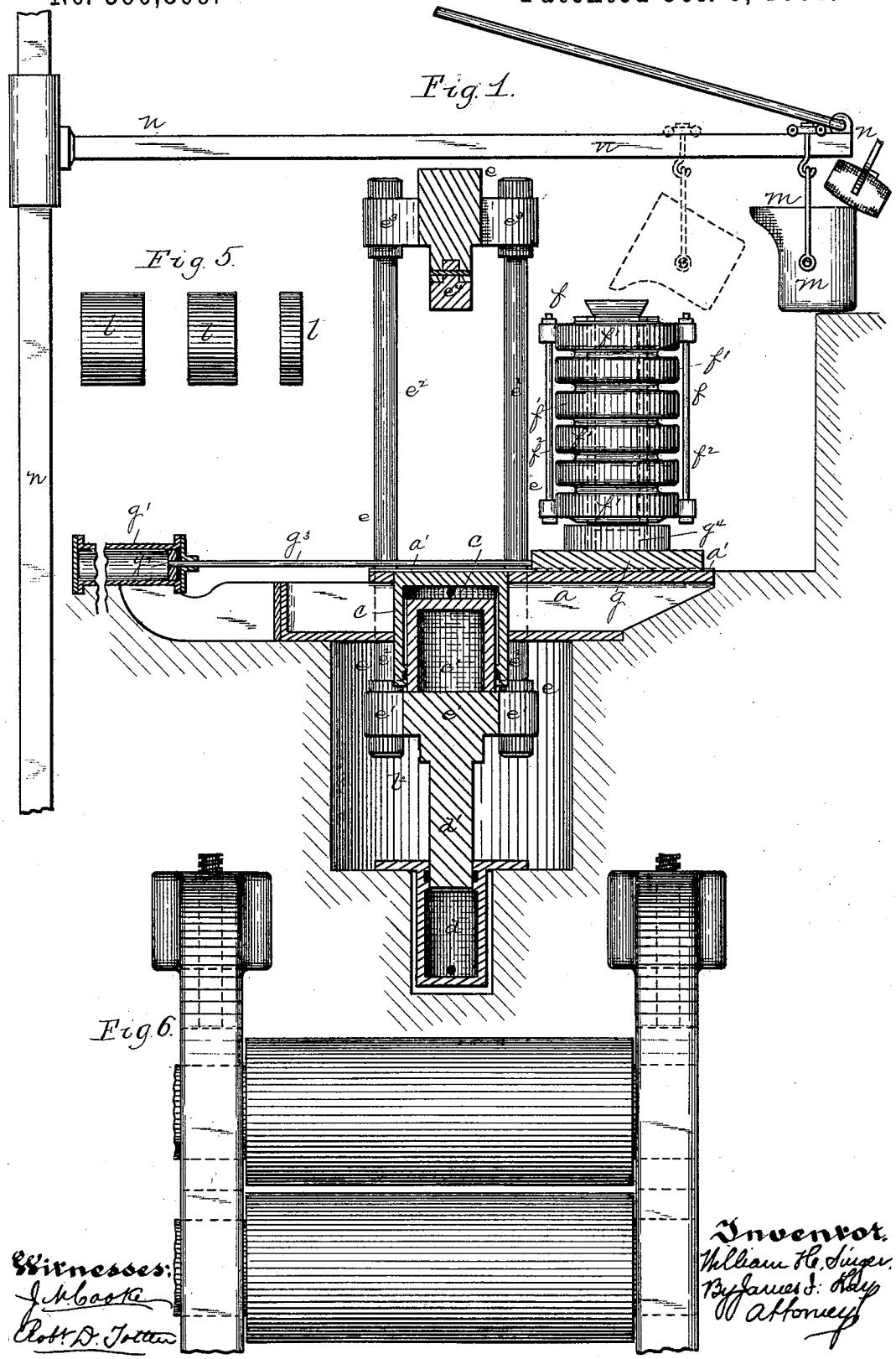

UNITED STATES PATENT OFFICE.

WILLIAM H. SINGER, OF ALLEGHENY, PENNSYLVANIA.

MANUFACTURE OF SAW-PLATES.

SPECIFICATION forming part of Letters Patent No. 390,809, dated October 9, 1888.

Application filed April 9, 1888. Serial No. 270.081. (No model.)

*To all whom it may concern:*

Be it known that I, WILLIAM H. SINGER, a resident of Allegheny, in the county of Allegheny and State of Pennsylvania, have invented a new and useful Improvement in the Manufacture of Saw-Plates; and I do hereby declare the following to be a full, clear, and exact description thereof.

My invention relates to the manufacture of circular-saw plates, these plates being formed from cast-steel, and, especially in the large sizes thereof, costing a large amount to make, and in the finished article being very expensive.

The object of my invention is to form a circular-saw plate entirely free from any such imperfections as will form splits or seams in the finished saw, and so overcome the most serious difficulty in connection with the manufacture and use of these articles.

The method heretofore practiced of making these plates has been to cast steel of proper carbon in the ordinary ingot-mold, (it being found that the ingot so cast always contains a pipe-cavity, caused by the settling of the steel in cooling, as well as other cavities or honeycomb,) and, after removing the portion supposed to contain the pipe-cavity, to reduce the ingot to plate. This ingot was rolled down in all directions, so as to produce a plate as nearly as possible of the proper gage and of even thickness throughout, and after the plate had been so rolled it was cut by suitable tools to the desired circular form. In the large sizes of saws, as those of from four to six feet diameter, the circumference of the plate thus obtained would be from twelve to eighteen feet, and the custom has been to examine carefully the edge of the saw around its entire circumference, by means of a microscope in many cases, in order to discover whether there are any seams or imperfections in the edge of the plate, so that such plates may be condemned for saw-making purposes. Where, however, the plate was, so far as this examination showed, free from seams and cracks, the plate was shipped to the saw-manufacturer. The plate was then taken by the saw-manufacturer, the teeth cut therein, the plate properly tempered, and then made perfectly straight and true, this operation requiring a very careful hand-hammering by men long skilled in the art. The saw-plate thus produced was then ground by suitable grindstones, and thereby brought to a perfect gage, and subsequent to the grinding was properly polished, the saw being then ready for the finishing operation of spreading or swaging the teeth. These operations, especially in large-sized saws, are extremely expensive and raise the expense of the saw in many cases to from one hundred and seventy-five dollars to two hundred dollars, and all these operations would in many cases be performed without discovering any imperfections in the plate, even though careful search therefor was made; but, though the plate had so far been found to be perfect in weld, the swaging of the teeth would in many cases develop seams or splits in the metal, the metal being spread under the swaging operation, and it frequently occurring that as the point of the tooth was spread the metal would part in the tooth, and in some cases flake off, so rendering the plate useless, or at best rendering it necessary to repeat the entire manufacture of the plate, cutting it down to smaller diameter, and in many cases, as the seams or splits would extend for a considerable distance into the metal, the same imperfection would be developed in the smaller saw. It would also often occur that as these seams were caused by pin-holes or blow-holes in the body of the ingot, which could not be closed and rewelded after the metal was set, and though the saw when finished and its teeth swaged might seem perfect, yet after it had been in use for a considerable period the gumming of the saw would cut into the seam or split in the metal, and the saw thus be rendered useless, so that the saw-maker would be compelled to replace it with a perfect one. These difficulties in the manufacture of circular-saw plates have been found for years, and have been the source of large losses both to the blank-maker and the saw-manufacturer, as well as the user of the finished saw, and it has become evident that by the overcoming of such difficulties in the manufacture of these articles a great advance in the art would be obtained. The manufacture of these plates has also heretofore required a considerable waste of metal, as the plates were rolled from angular ingots, and in rolling the plates to the exact gage it was necessary to roll them in all directions, so that there was a considerable waste of metal in the plates, especially for the larger sizes of saws. After careful consideration of the subject, together with experimenting at large expense in connection therewith, I have been enabled to produce a saw-plate which is entirely free from these seams or splits, and in which the metal is solid and homogeneous, and have therefore overcome the principal difficulty in the manufacture of practically perfect circular-saw plates. I have also, in connection with my improved method of forming these saw-plates, been enabled to save a large portion of metal in the rolling of the plate, reducing the loss by scrap in the plate to a minimum.

My invention, generally stated, consists in forming these circular-saw plates free from splits, seams, or like imperfections by casting the steel in a large body within an ingot-mold and subjecting the molten steel therein to heavy and continuous pressure until the metal is congealed, then dividing the compressed ingot into disks of the proper thickness to form the plates of the desired diameter and gage, and finally heating the disks and reducing them in thickness and enlarging them radially to form the circular-saw plates.

It also consists in forming the large compressed ingot cylindrical in shape, and then cutting it into disks and rolling these disks in all directions to the desired gage, thus producing substantially circular plates of proper gage from which to cut the circular-saw plates, it being found that in so doing I am enabled to save a large percentage in waste metal.

To enable others skilled in the art to practice my invention, I will describe the same more fully, referring to the accompanying drawings, in which—

Figure 1 is a longitudinal central section of the apparatus employed for compressing the ingot, illustrating the filling of the metal within the ingot-mold. Fig. 2 is a like view showing the ingot under compression. Fig. 3 is a view of the cylindrical compressed ingot obtained. Fig. 4 illustrates the method of slotting or dividing this ingot into the disks or sections of the proper weight for the formation of the plates. Fig. 5 shows the disks obtained. Fig. 6 is a view of the plate-rolls employed in reducing the disks. Fig. 7 illustrates the plate rolled from the disk, and Fig. 8 is a view of the finished saw-plate ready for shipment to the manufacturer of the saw.

Like letters of reference indicate like parts in each.

My invention may be employed with any suitable apparatus, that illustrated in the drawings being found by me well adapted for the purpose. In it I employ the hydraulic compressing apparatus, such as illustrated in Figs. 1 and 2. This compressing apparatus consists of the bed $a$, firmly supported over a pit, $b$, in which is contained the two cylinders $c\ d$, the cylinder $c$ being employed to obtain the heavy pressure necessary in compressing the ingot, and the cylinder $d$ being employed to raise and lower the pressing-frame during the other operations of the apparatus. Moving in the cylinder $c$ is the piston or plunger $c'$, which is secured to the vertically-moving pressing-frame $e$, formed of the lower cross-head, $e'$, to which the plunger $c'$ is secured, the standards $e^2$ extending up therefrom and the upper cross-head, $e^3$, carrying the pressing-plunger $e^4$, which enters the upper end of the ingot-mold. Extending down from the lower cross-head, $e'$, is the piston or plunger $d'$, which enters the lower or smaller cylinder, $d$, supported at the base of the pit, and through which the movable frame $e$ is raised and supported to manipulate the apparatus when the compressing force is not applied, while the plunger $c'$ within the cylinder $c$ operates to draw down the movable frame and impart the heavy pressure desired to the molten metal within the ingot-mold $f$. This ingot-mold $f$ is supported on a suitable carriage, $g$, running on suitable guides, $a'$, on the stationary bed $a$ and operated through the hydraulic cylinder $g'$, which has therein the piston $g^2$, the piston-rod $g^3$, which is secured to the carriage $g$, and through which the carriage is drawn under the pressing apparatus after the filling of the mold or removed from the pressing apparatus after the compressing operation, the carriage $g$ resting during the operation directly above the compressing-cylinder $c$. The carriage $g$ has secured thereto directly under the plunger-head $e^4$ of the vertically-moving frame $e$ the base-block $g^4$, and around this base-block is fitted the ingot-mold $f$, said mold, as shown, being formed of a series of rings, $f'$, held firmly together by bolts $f^2$, and bent openings being formed between the different rings.

The ingot-mold $f$ is lined with sand in a suitable manner, this construction of mold, as described in an application of even date herewith, Serial No. 270,085, permitting the venting of the gases from the molten steel, which, under the heavy pressure imparted to the molten steel, is forced through the body of sand and can escape through said vent-openings between the rings of the mold.

In forming the ingot in the most approved manner I line the ingot-mold with sheet metal, as at $j$, and interpose between this sheet-metal lining and the mold a body of sand, $j'$, suitably rammed to place. This sheet-metal lining, while it confines the sand within the ingot-mold and prevents the agglomeration of the molten steel therewith, also becomes highly heated by the molten metal, and in its soft condition will permit the passage of the gases from the ingot under the heavy pressure to which the metal is subjected, the gases, as it were, puncturing the sheet-metal lining and escaping through the body of sand and enabling me to obtain a much more perfect ingot. The mold-cavity is formed cylindrical, thus imparting to the compressed ingot a cylindrical shape, which enables me, as hereinafter described, in rolling out the saw-plate to save a large amount of waste or scrap.

The cylindrical compressed ingot $h$, formed as hereinafter described, is divided into disks or sections in the following manner: The ingot is supported in a suitable lathe, $k$, and is centered therein in the ordinary manner, and by means of a series of cutters, $k'$, supported on the lathe at any desired position, the ingot is gradually grooved or channeled through the same, as shown in Fig. 4, thus forming the disks $l$ of the desired thickness and weight. The apparatus employed for reducing these disks to plate metal are the ordinary plate-rolls; or, if desired, the disk may be first reduced under the hammer and subsequently rolled, suitable rolls for reducing and enlarging the disks being shown in Fig. 6. Located near the compressing apparatus is a suitable crane, carrying at end thereof a ladle, $m$, which ladle can be drawn close to the casting-floor and the metal from the several crucibles poured within the ladle, as illustrated in Fig. 1.

In carrying out my improved process of forming these saw-plates the ingot-mold $f$ on the carriage $g$ is forced by the cylinder $g'$ to one side of the compressing apparatus, and the mold is suitably lined, as before described. As soon as the molten steel is ready to cast, the ladle $m$, supported on the crane $n$, is brought close to the casting-floor, and is gradually filled with molten metal from the crucibles, a large body of molten steel being thus collected within the ladle. The molten steel in the ladle is then poured into the ingot-mold, a removable funnel being preferably employed in filling the mold to prevent injury to it or its sheet-metal lining by the molten steel. As soon as the mold is filled a removable pressing-block, $r$, is placed therein to prevent injury to the pressing-plunger $e^4$ of the compressing apparatus, this plunger $e^4$ acting on the pressing-block. The vertical movable frame $e$ is then raised by the admission of water within the hoisting-cylinder $d$, and the carriage $g$, carrying the ingot-mold containing the ingot, is then drawn under the vertically-moving frame $e$ by means of the hydraulic cylinder $g'$. Water is then admitted to the compressing-cylinder $c$ and exhausted from the cylinder $d$, and the frame $e$ thus drawn down, the plunger-head $e^4$ entering the upper end of the ingot-mold and bearing against the removable block $r$, placed therein. A heavy compressing force is thus exerted upon the molten metal within the mold through the compressing-cylinder $c$ and pressing-frame $e$, the frame being drawn down with a force which is gradually increased as the metal is compressed until a pressure of from six to seven tons per square inch is brought upon the metal, and this compression is continued until the metal within the mold is congealed, the pressure being generally continued from three-quarters of an hour to an hour and a quarter, the gases and air contained in the molten metal being forced outwardly by the enormous pressure through the sheet-metal lining $j$, which is punctured thereby, and escaping through the body of the sand and thence between the rings of the mold; and by this means all gases or air within the molten steel are expelled therefrom and a solid homogeneous body entirely free from honey-comb or blow-holes obtained, the compressed ingot being solid and homogeneous throughout. As soon as the metal has cooled, the compressed ingot $h$ is removed from the ingot-mold, this being accomplished, where a mold of sectional rings, as shown, is employed, by loosening and removing the bolts $f^2$ and removing the several rings forming the molds, thus exposing the finished compressed ingot. As the metal is confined while in a highly-molten condition by the sheet-metal lining, the compressed ingot is delivered substantially the same diameter throughout, and the mixing or agglomeration of the steel with the sand lining is prevented. This ingot is then mounted in the lathe $k$ and the cutting-tools $k'$ adjusted on said lathe, according to the size and weight of the disks to be formed, the weight of the several disks or sections being approximately calculated according to the diameter and thickness of the plates to be formed. The compressed ingot is then cut by this apparatus almost through, leaving only a small portion between the several disks to support the metal within the lathe, and after the grooving of the ingot it is withdrawn from the lathe and the several disks broken apart, disks of proper weight for forming the desired sizes of saw-plates being thus obtained. These disks are found to be solid and homogeneous throughout, all honey-combs, pin-holes, or blow-holes which would be found in the ordinary ingots being thus removed. The disks or blanks are then reheated in a suitable furnace, and, either through plate-rolls or by means of steam-hammers, reduced, and subsequently, by means of plate-rolls, the disks or sections are rolled out to the desired gage, the disk being rolled in all directions in order to bring them to the exact gage desired and to spread the metal evenly, the blanks being thus enlarged radially and forming substantially circular plate, as shown in Fig. 7. After the formation of the plates they are sheared by suitable tools, forming the finished saw-plates, as illustrated in Fig. 8.

As the disks from which the saw-plates have been formed are solid and homogeneous, and the metal thereof is firmly united and welded together, saw-plates are obtained which are without flaw, seam, or split, and consequently there is no liability whatever of the formation or opening of seams or splits in the metal by the subsequent cutting of the saw-teeth therein, or the reheating and tempering of the plates, or of the straightening or polishing of the plate, or after the finished saw is obtained by the swaging of the teeth, either before the saw is shipped by the manufacturer or subsequently thereto, when the saw is resharpened or reswaged when in use. As in the rolling of the circular disks to finished saw-plates the plate is rolled or drawn in all directions in order to form it of even gage, as before referred to, the circular disks draw out into a substantially-circular plate, and, instead of forming a large amount of scrap metal beyond the saw-plate to be formed therefrom, there is but little scrap formed in the cutting of the saw-plate, since the saw-plate is brought to substantially-circular shape during the rolling operation, a large saving being thus obtained.

By my improved process I am thus enabled to form a practically perfect saw-plate which is entirely free from hidden seams or imperfections, all liability of splitting or opening during the subsequent operations in forming the finished saw therefrom or in swaging or spreading the teeth thereof being overcome, and, though a large number of saw-plates have been formed by my improved process, there have been none formed to my knowledge in which any such seams, splits, or imperfections have been subsequently developed, either in the manufacture of the saw or in subsequent use, my improved process therefore giving absolute certainty of a perfect saw where the plate is properly handled, and the large loss, both to the saw-plate manufacturer and to the saw-manufacturer, being thus entirely overcome.

What I claim as my invention, and desire to secure by Letters Patent, is—

1. The improvement in the art of forming plates for circular saws, consisting in casting a large body of molten steel within a mold and subjecting it to heavy and continuous pressure during cooling, then dividing the compressed ingot transversely into sections or disks, and finally reducing said disks in thickness and enlarging them radially, substantially as and for the purposes set forth.

2. The improvement in the art of forming plates for circular saws, consisting in casting the molten steel within a cylindrical mold and subjecting it to heavy and continuous pressure during cooling, then dividing the cylindrical compressed ingot into disks, and finally reducing said disks and enlarging them radially to produce a substantially-circular plate, substantially as and for the purposes set forth.

3. The improvement in the art of forming blanks for the manufacture of circular-saw plates, consisting in casting a large body of molten steel within a mold and subjecting it to heavy and continuous pressure during cooling, and then dividing said compressed ingot transversely into sections, substantially as and for the purposes set forth.

In testimony whereof I, the said WILLIAM H. SINGER, have hereunto set my hand.

WILLIAM H. SINGER.

Witnesses:
  ROBT. D. TOTTEN,
  J. N. COOKE.